United States Patent
Casper et al.

(10) Patent No.: US 7,496,646 B2
(45) Date of Patent: Feb. 24, 2009

(54) SYSTEM AND METHOD FOR MANAGEMENT OF A STORAGE AREA NETWORK

(75) Inventors: Corene Casper, Round Rock, TX (US); Kenneth F. Dove, Banks, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 10/251,690

(22) Filed: Sep. 20, 2002

(65) Prior Publication Data

US 2003/0065760 A1      Apr. 3, 2003

Related U.S. Application Data

(60) Provisional application No. 60/327,191, filed on Oct. 1, 2001, provisional application No. 60/324,787, filed on Sep. 24, 2001, provisional application No. 60/324,243, filed on Sep. 21, 2001, provisional application No. 60/324,242, filed on Sep. 21, 2001, provisional application No. 60/324,226, filed on Sep. 21, 2001, provisional application No. 60/324,224, filed on Sep. 21, 2001, provisional application No. 60/324,196, filed on Sep. 21, 2001, provisional application No. 60/324,195, filed on Sep. 21, 2001.

(51) Int. Cl.
*G06F 15/173* (2006.01)
*G06F 15/16* (2006.01)

(52) U.S. Cl. .................. 709/223; 709/246; 709/239

(58) Field of Classification Search ............... 709/223, 709/239, 246, 39
See application file for complete search history.

(56) References Cited

U.S. PATENT DOCUMENTS

| | | | |
|---|---|---|---|
| 5,276,872 A | 1/1994 | Lomet et al. | 395/600 |
| 5,438,464 A | 8/1995 | Lewis et al. | 390/73.03 |
| 5,678,026 A | 10/1997 | Vartti et al. | 395/479 |
| 5,751,992 A | 5/1998 | Bhargava et al. | 395/457 |
| 5,813,016 A | 9/1998 | Sumimoto | 707/201 |
| 5,850,507 A | 12/1998 | Ngai et al. | 707/202 |
| 5,909,540 A * | 6/1999 | Carter et al. | 714/4 |
| 5,913,227 A | 6/1999 | Raz et al. | 711/152 |
| 5,920,872 A | 7/1999 | Grewell et al. | 707/202 |
| 5,953,719 A | 9/1999 | Kleewein et al. | 707/8 |

(Continued)

OTHER PUBLICATIONS

Lomet, David; *Private Locking and Distributed Cache Management*; Proceedings of the Third International Conference on Parallel and Distributed Information Systems (PDIS 94), Austin, TX; Sep. 28-30, 1994.

*Primary Examiner*—Ario Etienne
*Assistant Examiner*—El Hadji M Sall (57) ABSTRACT

A storage area network is managed. In one embodiment, the method comprises providing a plurality of nodes; providing a plurality of storage, wherein the plurality of storage is shared by the plurality of nodes; determining if a change in the storage area network has occurred; and dynamically adjusting to the change if the change has occurred. In another embodiment, the system comprises a processor configured to communicate with a second node and at least one storage, wherein the storage is shared by the processor and the second node; the processor also being configured to determine if a change in the storage area network has occurred; and dynamically adjusting to the change if the change has occurred; and a memory coupled with the processor, the memory configured to provide instructions to the processor.

16 Claims, 11 Drawing Sheets

U.S. PATENT DOCUMENTS

| | | | |
|---|---|---|---|
| 5,960,446 A | 9/1999 | Schmuck et al. | 707/205 |
| 5,987,506 A | 11/1999 | Carter et al. | 709/213 |
| 6,021,508 A | 2/2000 | Schmuck et al. | 714/4 |
| 6,026,474 A | 2/2000 | Carter et al. | 711/202 |
| 6,044,367 A | 3/2000 | Wolff | 707/2 |
| 6,108,654 A | 8/2000 | Chan et al. | 707/8 |
| 6,154,512 A | 11/2000 | Homan | 375/376 |
| 6,163,855 A | 12/2000 | Shrivastava et al. | 714/4 |
| 6,226,717 B1 | 5/2001 | Reuter et al. | 711/147 |
| 6,256,740 B1 * | 7/2001 | Muller et al. | 726/12 |
| 6,272,491 B1 * | 8/2001 | Chan et al. | 707/8 |
| 6,370,625 B1 | 4/2002 | Carmean et al. | 711/152 |
| 6,643,748 B1 * | 11/2003 | Wieland | 711/152 |
| 6,757,277 B1 * | 6/2004 | Shaffer et al. | 370/356 |
| 2002/0101946 A1 | 8/2002 | Hartman et al. | 375/376 |
| 2002/0150126 A1 | 10/2002 | Kovacevic | 370/503 |
| 2003/0041138 A1 * | 2/2003 | Kampe et al. | 709/223 |
| 2004/0213239 A1 * | 10/2004 | Lin et al. | 370/395.1 |

\* cited by examiner

SYSTEM AND METHOD FOR MANAGEMENT OF A STORAGE AREA NETWORK

CROSS REFERENCE TO RELATED APPLICATIONS

This application claims priority to U.S. Provisional Patent Application No. 60/324,196 entitled SHARED STORAGE LOCK: A NEW SOFTWARE SYNCHRONIZATION MECHANISM FOR ENFORCING MUTUAL EXCLUSION AMONG MULTIPLE NEGOTIATORS filed Sep. 21, 2001, which is incorporated herein by reference for all purposes.

This application claims priority to U.S. Provisional Patent Application No. 60/324,226 entitled JOURNALING MECHANISM WITH EFFICIENT, SELECTIVE RECOVERY FOR MULTI-NODE ENVIRONMENTS filed Sep. 21, 2001, which is incorporated herein by reference for all purposes.

This application claims priority to U.S. Provisional Patent Application No. 60/324,224 entitled COLLABORATIVE CACHING IN A MULTI-NODE FILESYSTEM filed Sep. 21, 2001, which is incorporated herein by reference for all purposes.

This application claims priority to U.S. Provisional Patent Application No. 60/324,242 entitled DISTRIBUTED MANAGEMENT OF A STORAGE AREA NETWORK filed Sep. 21, 2001, which is incorporated herein by reference for all purposes.

This application claims priority to U.S. Provisional Patent Application No. 60/324,195 entitled METHOD FOR IMPLEMENTING JOURNALING AND DISTRIBUTED LOCK MANAGEMENT filed Sep. 21, 2001, which is incorporated herein by reference for all purposes.

This application claims priority to U.S. Provisional Patent Application No. 60/324,243 entitled MATRIX SERVER: A HIGHLY AVAILABLE MATRIX PROCESSING SYSTEM WITH COHERENT SHARED FILE STORAGE filed Sep. 21, 2001, which is incorporated herein by reference for all purposes.

This application claims priority to U.S. Provisional Patent Application No. 60/324,787 entitled A METHOD FOR EFFICIENT ON-LINE LOCK RECOVERY IN A HIGHLY AVAILABLE MATRIX PROCESSING SYSTEM filed Sep. 24, 2001, which is incorporated herein by reference for all purposes.

This application claims priority to U.S. Provisional Patent Application No. 60/327,191 entitled FAST LOCK RECOVERY: A METHOD FOR EFFICIENT ON-LINE LOCK RECOVERY IN A HIGHLY AVAILABLE MATRIX PROCESSING SYSTEM filed Oct. 1, 2001, which is incorporated herein by reference for all purposes.

This application is related to U.S. Pat. No. 7,149,853 issued on Dec. 12, 2006 and entitled A SYSTEM AND METHOD FOR SYNCHRONIZATION FOR ENFORCING MUTUAL EXCLUSION AMONG MULTIPLE NEGOTIATORS filed concurrently herewith, which is incorporated herein by reference for all purposes; and U.S. Pat. No. 7,111,197 issued Sep. 19, 2006 and entitled SYSTEM AND METHOD FOR JOURNAL RECOVERY FOR MULTINODE ENVIRONMENTS filed concurrently herewith, which is incorporated herein by reference for all purposes; and co-pending U.S. patent application having Ser. No. 10/251,645 published on Oct. 14, 2004 as U.S. publication number 20040202013 and entitled A SYSTEM AND METHOD FOR COLLABORATIVE CACHING IN A MULTINODE SYSTEM filed concurrently herewith, which is incorporated herein by reference for all purposes; and U.S. Pat. No. 7,240,057 issued on Jul. 3, 2007 and entitled SYSTEM AND METHOD FOR IMPLEMENTING JOURNALING IN A MULTI-NODE ENVIRONMENT filed concurrently herewith, which is incorporated herein by reference for all purposes; and co-pending U.S. patent application having Ser. No. 10/251,895 published on Apr. 3, 2003 as U.S. publication number 20030065686 and entitled A SYSTEM AND METHOD FOR A MULTI-NODE ENVIRONMENT WITH SHARED STORAGE filed concurrently herewith, which is incorporated herein by reference for all purposes; and U.S. Pat. No. 7,266,722 issued on Sep. 4, 2007 and entitled A SYSTEM AND METHOD FOR EFFICIENT LOCK RECOVERY filed concurrently herewith, which is incorporated herein by reference for all purposes.

FIELD OF THE INVENTION

The present invention relates generally to computer systems. In particular, the present invention relates to computer systems that share resources such as storage.

BACKGROUND OF THE INVENTION

Servers are typically used for big applications and work loads such as those used in conjunction with large web services and manufacturing. Often, a single server does not have enough power to perform the required application. Several servers may be used in conjunction with several storage devices in a storage area network (SAN) to accommodate heavy traffic. As systems get larger, applications often need to be highly available to avoid interruptions in service.

A typical server management system uses a single management control station that manages the servers and the shared storage. A potential problem of such a system is that it may have a single point of failure which can cause a shutdown of the entire storage area network to perform maintenance. Another potential problem is that there is typically no dynamic cooperation between the servers in case a change to the system occurs. Often in such a system all servers need be shutdown to perform a simple reconfiguration of the shared storage. This type of interruption is typically unacceptable for mission critical applications What is needed is a system and method for management of a storage area network that allows dynamic cooperation among the servers and does not have a single point of failure. The present invention addresses such needs.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
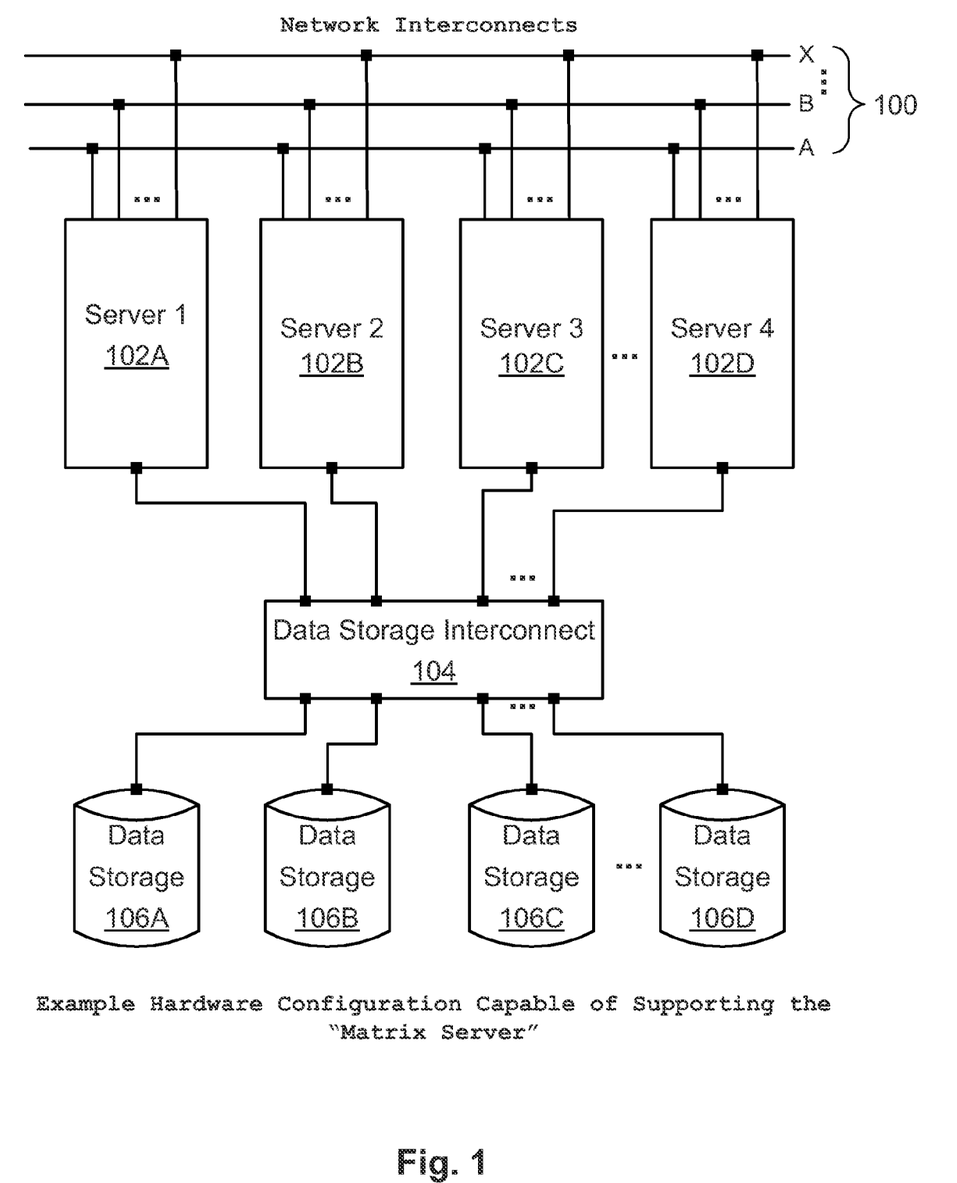
FIG. 1 is a block diagram of a shared storage system suitable for facilitating an embodiment of the present invention.

FIG. 1 is a block diagram of a shared storage system suitable for facilitating the management of a storage area network according to an embodiment of the present invention. In this example, nodes 102A-102D are coupled together through a network switch 100. The network switch 100 can represent any network infrastructure such as an Ethernet. Additionally, the nodes 102A-102D are also shown to be coupled to a data storage interconnect 104. An example of the data storage interconnect 104 is a fiber channel switch, such as a Brocade fiber channel switch. Examples of nodes 102A-102D include but are not limited to computers, servers, and any other processing units or applications that can share storage or data. For exemplary purposes, nodes 102A-102D will sometimes be referred to as servers. The data interconnect 104 is shown to be coupled to shared storage 106A-106D. Examples of shared storage 106A-106D include any form of storage such as hard drive disks, compact disks, tape, and random access memory.

Although the system shown in FIG. 1 is a multiple node system, the present invention can also be used with a single computer system for synchronizing various applications as they share data on a shared storage.

Shared storage can be any storage device, such as hard drive disks, compact disks, tape, and random access memory. A filesystem is a logical entity built on the shared storage. Although the shared storage is typically considered a physical device while the filesystem is typically considered a logical structure overlaid on part of the storage, the filesystem is sometimes referred to herein as shared storage for simplicity. For example, when it is stated that shared storage fails, it can be a failure of a part of a filesystem, one or more filesystems, or the physical storage device on which the filesystem is overlaid. Accordingly, shared storage, as used herein, can mean the physical storage device, a portion of a filesystem, a filesystem, filesystems, or any combination thereof.

Figure 2:
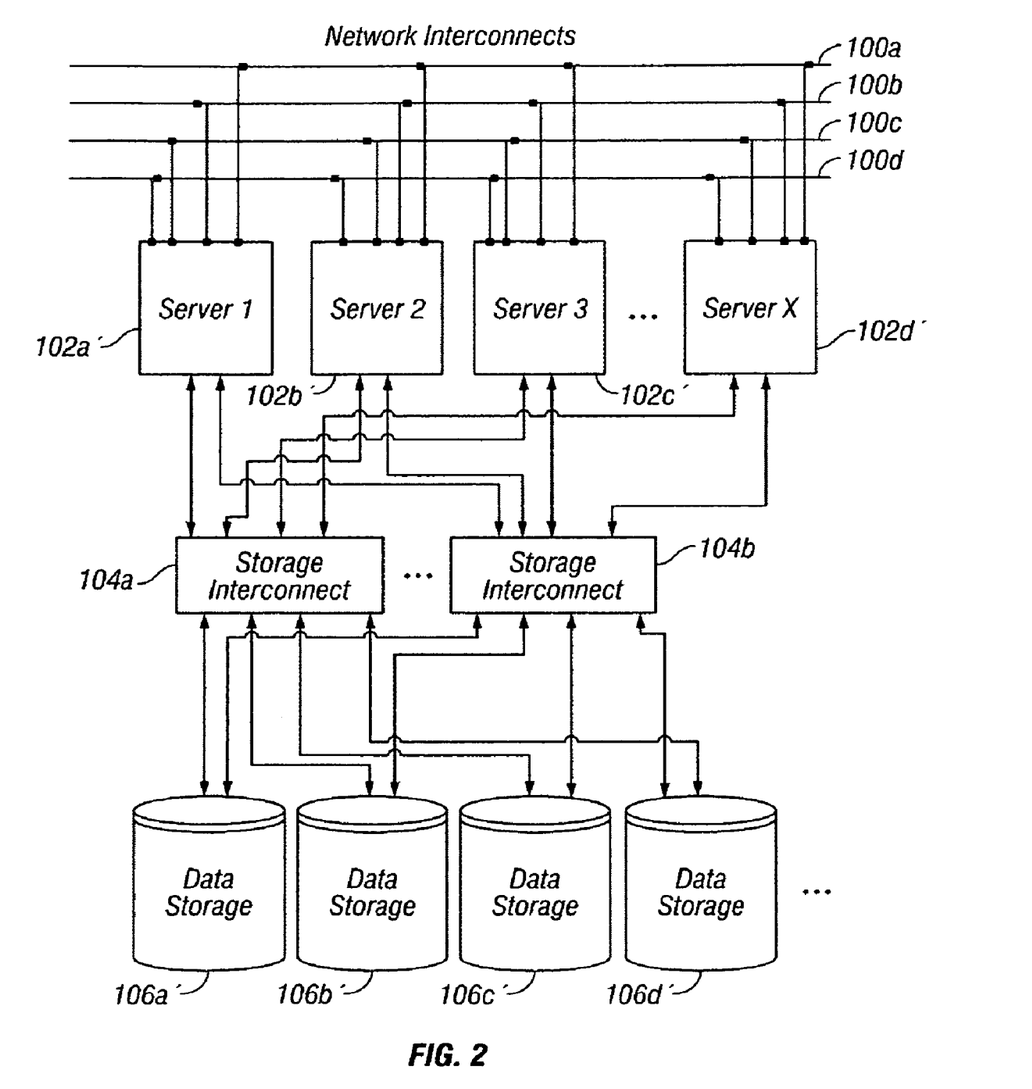
FIG. 2 is another block diagram of a system according to an embodiment of the present invention.

FIG. 2 is another block diagram of a system according to an embodiment of the present invention. In this example, the system preferably has no single point of failure. Accordingly, servers 102A'-102D' are coupled with multiple network interconnects 100A-100D. The servers 102A'-102D' are also shown to be coupled with multiple storage interconnects 104A-104B. The storage interconnects 104A-104B are each coupled to a plurality of data storage 106A'-106D'.

In this manner, there is redundancy in the system such that if any of the components or connections fail, the entire system can continue to operate.

In the example shown in FIG. 2, as well as the example shown in FIG. 1, the number of servers 102A'-102D', the number of storage interconnects 104A-104B, and the number of data storage 106A'-106D' can be as many as the customer requires and is not physically limited by the system. Likewise, the operating systems used by servers 100A'-100D' can also be as many independent operating systems as the customer requires.

Figure 3:
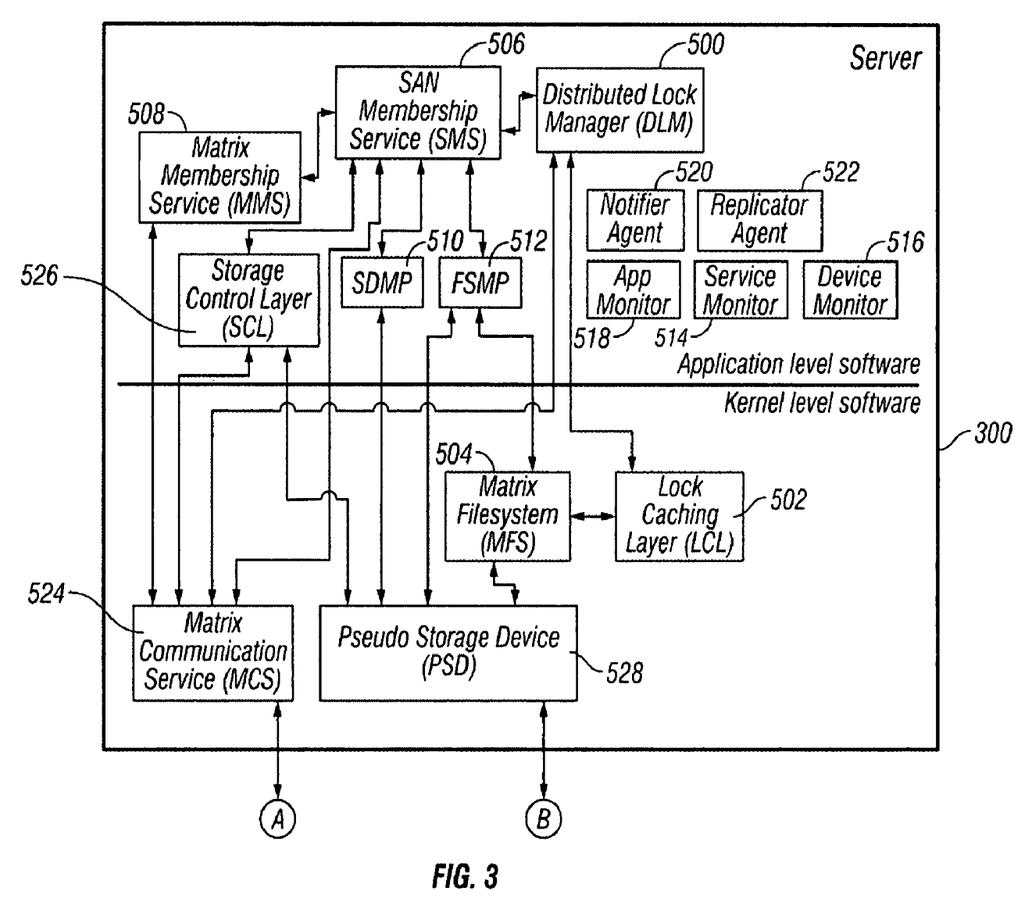
FIG. 3 is a block diagram of the software components of a server according to an embodiment of the present invention.

FIG. 3 is a block diagram of the software components of server 100. In this embodiment, the following components are shown:

The Distributed Lock Manager (DLM) 500 manages matrix-wide locks for the filesystem image 306a-306d, including the management of lock state during crash recovery. The Matrix Filesystem 504 uses DLM 500-managed locks to implement matrix-wide mutual exclusion and matrix-wide filesystem 306a-306d metadata and data cache consistency. The DLM 500 is a distributed symmetric lock manager. Preferably, there is an instance of the DLM 500 resident on every server in the matrix. Every instance is a peer to every other instance; there is no master/slave relationship among the instances.

The lock-caching layer ("LCL") 502 is a component internal to the operating system kernel that interfaces between the Matrix Filesystem 504 and the application-level DLM 500. The purposes of the LCL 502 include the following:

1. It hides the details of the DLM 500 from kernel-resident clients that need to obtain distributed locks.

2. It caches DLM 500 locks (that is, it may hold on to DLM 500 locks after clients have released all references to them), sometimes obviating the need for kernel components to communicate with an application-level process (the DLM 500) to obtain matrix-wide locks.

3. It provides the ability to obtain locks in both process and server scopes (where a process lock ensures that the corresponding DLM (500) lock is held, and also excludes local processes attempting to obtain the lock in conflicting modes, whereas a server lock only ensures that the DLM (500) lock is held, without excluding other local processes).

4. It allows clients to define callouts for different types of locks when certain events related to locks occur, particularly the acquisition and surrender of DLM 500-level locks. This ability is a requirement for cache-coherency, which depends on callouts to flush modified cached data to permanent storage when corresponding DLM 500 write locks are downgraded or released, and to purge cached data when DLM 500 read locks are released.

The LCL 502 is the only kernel component that makes lock requests from the user-level DLM 500. It partitions DLM 500 locks among kernel clients, so that a single DLM 500 lock has at most one kernel client on each node, namely, the LCL 502 itself. Each DLM 500 lock is the product of an LCL 502 request, which was induced by a client's request of an LCL 502 lock, and each LCL 502 lock is backed by a DLM 500 lock.

The Matrix Filesystem 504 is the shared filesystem component of The Matrix Server. The Matrix Filesystem 504 allows multiple servers to simultaneously mount, in read/write mode, filesystems living on physically shared storage devices 306a-306d. The Matrix Filesystem 504 is a distributed symmetric matrixed filesystem; there is no single server that filesystem activity must pass through to perform filesystem activities. The Matrix Filesystem 504 provides normal local filesystem semantics and interfaces for clients of the filesystem.

SAN (Storage Area Network) Membership Service 506 provides the group membership services infrastructure for the Matrix Filesystem 504, including managing filesystem membership, health monitoring, coordinating mounts and unmounts of shared filesystems 306a-306d, and coordinating crash recovery.

Matrix Membership Service 508 provides the Local, matrix-style matrix membership support, including virtual host management, service monitoring, notification services, data replication, etc. The Matrix Filesystem 504 does not interface directly with the MMS 508, but the Matrix Filesystem 504 does interface with the SAN Membership Service 506, which interfaces with the MMS 508 in order to provide the filesystem 504 with the matrix group services infrastructure.

The Shared Disk Monitor Probe 510 maintains and monitors the membership of the various shared storage devices in the matrix. It acquires and maintains leases on the various shared storage devices in the matrix as a protection against rogue server "split-brain" conditions. It communicates with the SMS 506 to coordinate recovery activities on occurrence of a device membership transition.

Filesystem monitors 512 are used by the SAN Membership Service 508 to initiate Matrix Filesystem 504 mounts and unmounts, according to the matrix configuration put in place by the Matrix Server user interface.

The Service Monitor 514 tracks the state (health & availability) of various services on each server in the matrix so that the matrix server may take automatic remedial action when the state of any monitored service transitions. Services monitored include HTTP, FTP, Telnet, SMTP, etc. The remedial actions include service restart on the same server or service fail-over and restart on another server.

The Device Monitor 516 tracks the state (health & availability) of various storage-related devices in the matrix so that the matrix server may take automatic remedial action when the state of any monitored device transitions. Devices monitored may include data storage devices 306a-306d (such as storage device drives, solid state storage devices, ram storage devices, JOBDs, RAID arrays, etc.)and storage network devices 304' (such as FibreChannel Switches, Infiniband Switches, iSCSI switches, etc.). The remedial actions include initiation of Matrix Filesystem 504 recovery, storage network path failover, and device reset.

The Application Monitor 518 tracks the state (health & availability) of various applications on each server in the matrix so that the matrix server may take automatic remedial action when the state of any monitored application transitions. Applications monitored may include databases, mail routers, CRM apps, etc. The remedial actions include application restart on the same server or application fail-over and restart on another server.

The Notifier Agent 520 tracks events associated with specified objects in the matrix and executes supplied scripts of commands on occurrence of any tracked event.

The Replicator Agent 522 monitors the content of any filesystem subtree and periodically replicates any data which has not yet been replicated from a source tree to a destination tree. The Replicator Agent 522 is preferably used to duplicate file private files between servers that are not accessed using Shared Data Storage (306).

The Matrix Communication Service 524 provides the network communication infrastructure for the DLM 500, Matrix Membership Service 508, and SAN Membership Service 506. The Matrix Filesystem 504 does not use the MCS 524 directly, but it does use it indirectly through these other components.

The Storage Control Layber (SCL) 526 provides matrix-wide device identification, used to identify the Matrix Filesystems 504 at mount time. The SCL 526 also manages storage fabric configuration and low level I/O device fencing of rogue servers from the shared storage devices 306a-306d containing the Matrix Filesystems 504. It also provides the ability for a server in the matrix to voluntarily intercede during normal device operations to fence itself when communication with rest of the matrix has been lost.

The Storage Control Layer 526 is the Matrix Server module responsible for managing shared storage devices 306a-306d. Management in this context consists of two primary functions. The first is to enforce I/O fencing at the hardware SAN level by enabling/disabling host access to the set of shared storage devices 306a-306d. And the second is to generate global(matrix-wide) unique device names (or "labels") for all matrix storage devices 306a-306d and ensure that all hosts in the matrix have access to those global device names. The SCL module also includes utilities and library routines needed to provide device information to the UI.

The Pseudo Storage Driver 528 is a layered driver that "hides" a target storage device 306a-306d so that all references to the underlying target device must pass through the PSD layered driver. Thus, the PSD provides the ability to "fence" a device, blocking all I/O from the host server to the underlying target device until it is unfenced again. The PSD also provides an application-level interface to lock a storage partition across the matrix. It also has the ability to provide common matrix-wide 'handles', or paths, to devices such that all servers accessing shared storage in the Matrix Server can use the same path to access a given shared device.

Figure 4A:
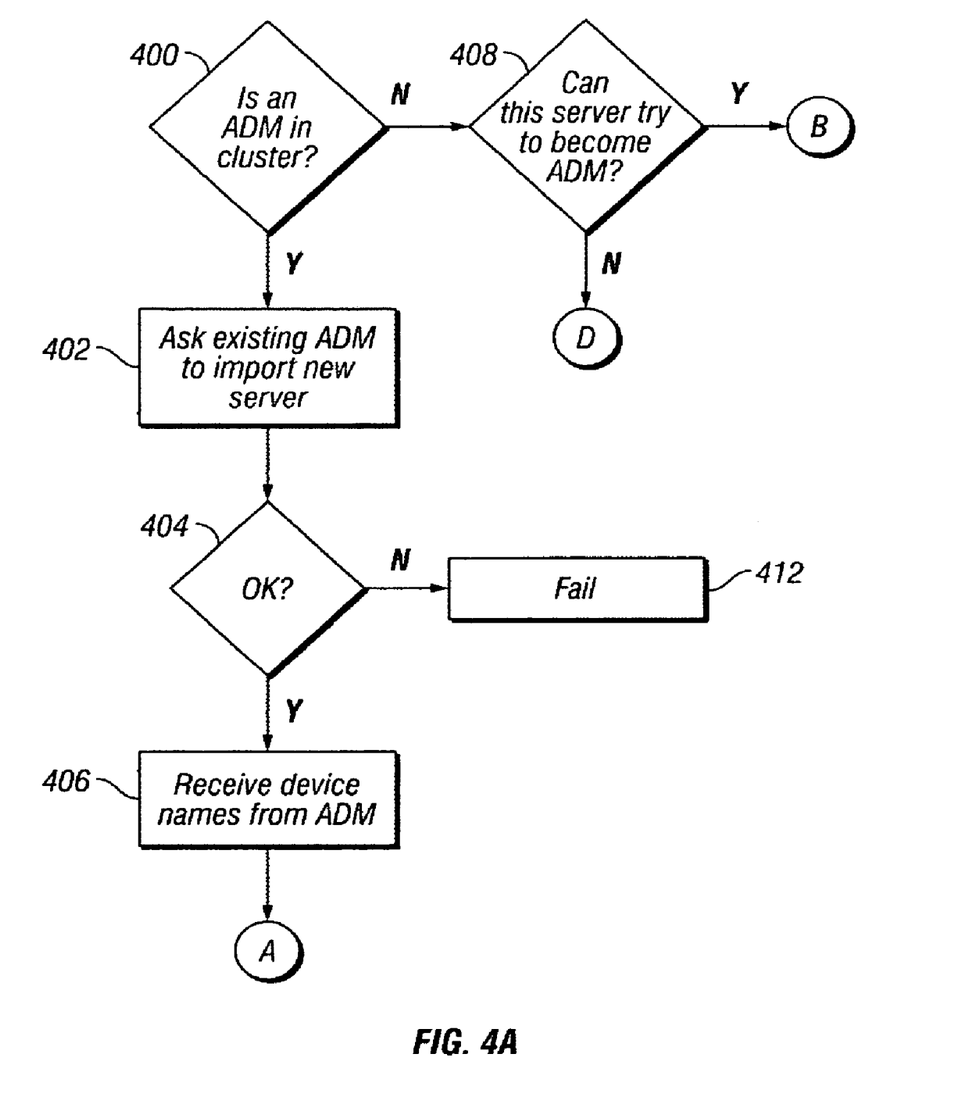
FIGS. 4A-4B are flow diagrams of a method according to an embodiment of the present invention for adding a node.
Figure 4B:
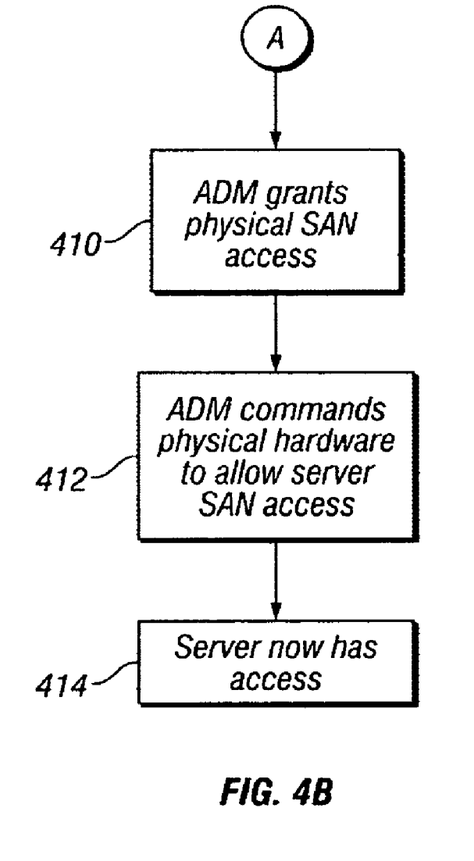

FIGS. 4A-4B are flow diagrams of a method according to an embodiment of the present invention for adding a node to a cluster of servers sharing storage such as a disk.

In this example, it is determined whether there is an administrator (ADM) in the cluster (400). The cluster includes the set of servers that cooperate to share a shared resource such as the shared storage. One of the servers in the cluster is dynamically elected to act as an administrator to manage the shared storage in the cluster. If there is no administrator in the cluster, then it is determined whether this server can try to become the administrator (408). If this server can try to become the administrator then the server begins an election process shown in FIGS. 5B-5C, and successful completion of this process results in the election of this server as the administrator.

Figure 5A:
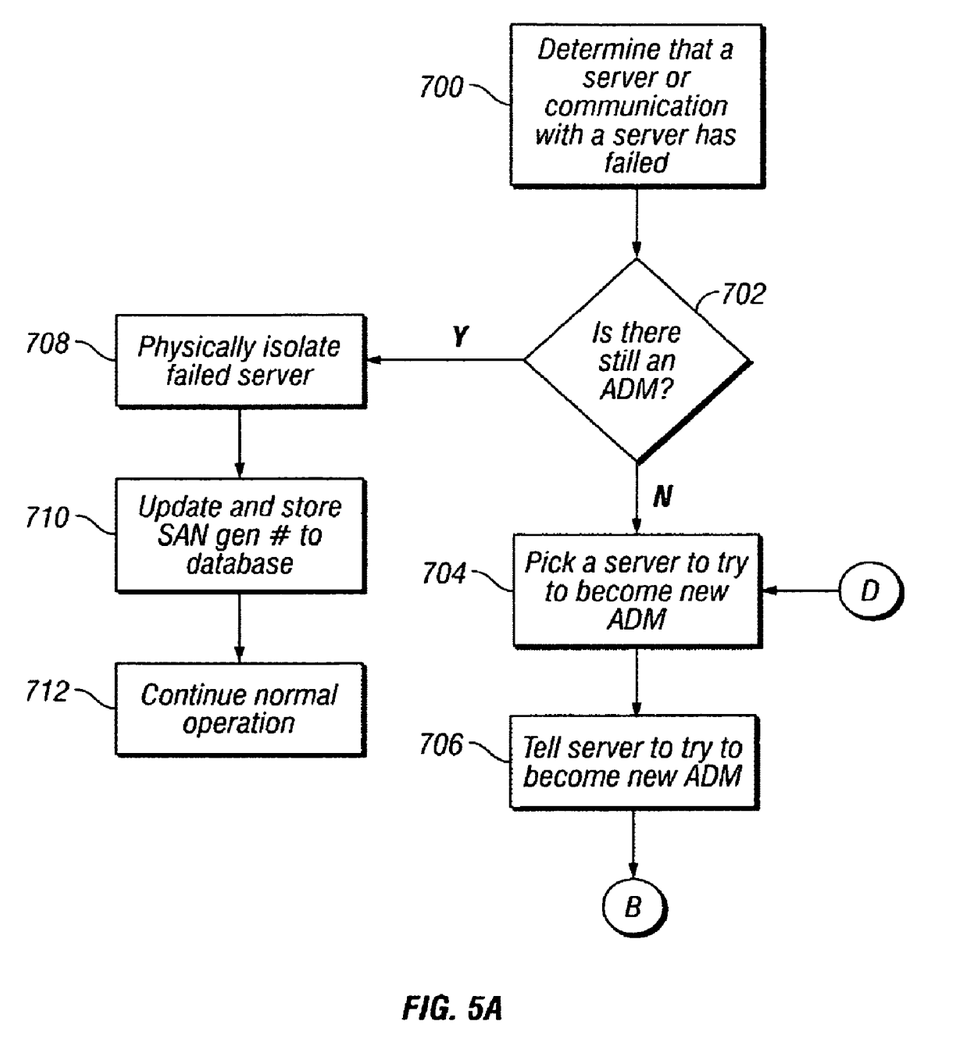
FIGS. 5A-5C are flow diagrams of a method according to the present invention for handling a server failure.

If, however, the server cannot become the administrator, the group coordinator then selects a server to try to become the new administrator (704 FIG. 5A). An example of how this server can not become the administrator (408) is if another server became the administrator during the time this server established that there was no administrator and then tried to become the administrator, or it had faulty connectivity to the storage network. In this case a partial failure recovery is started in step 704 of FIG. 5A. If there is an existing administrator in the cluster (400), the existing administrator is then asked to import the new server into the cluster (402). It is then determined whether it is permissible for this server to be imported into the cluster (404). If it is not permissible then the process of adding this server to the cluster has failed (412). Examples of reasons why adding the server would fail include this server not being healthy or having a storage area network generation number mismatch with the generation number used by the administrator.

If this server can be imported (404), then it receives device names from the administrator (406). Examples of device names include cluster wide names of shared storage.

The administrator grants physical storage area network access to this server (410 of FIG. 4B). The administrator then commands the physical hardware to allow this server storage area network (SAN) access (412). This server now has access to the SAN (414).

Figure 5B:
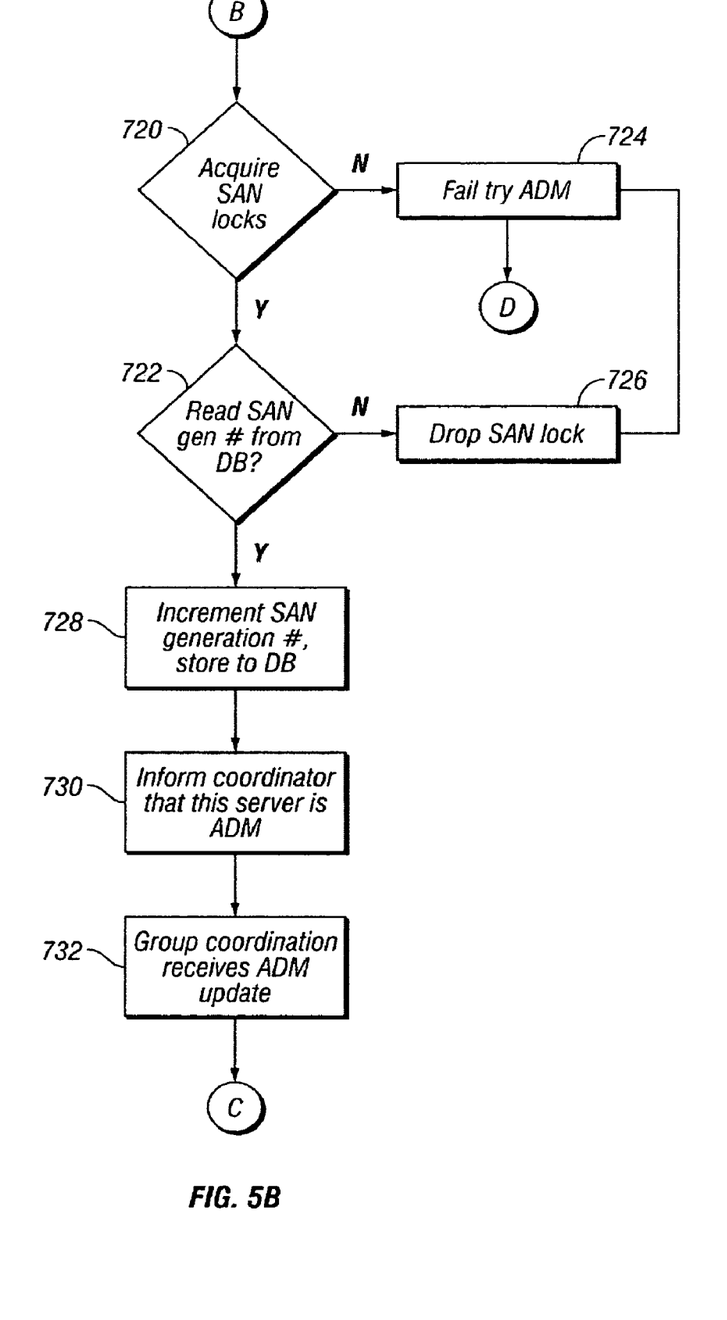
Figure 5C:
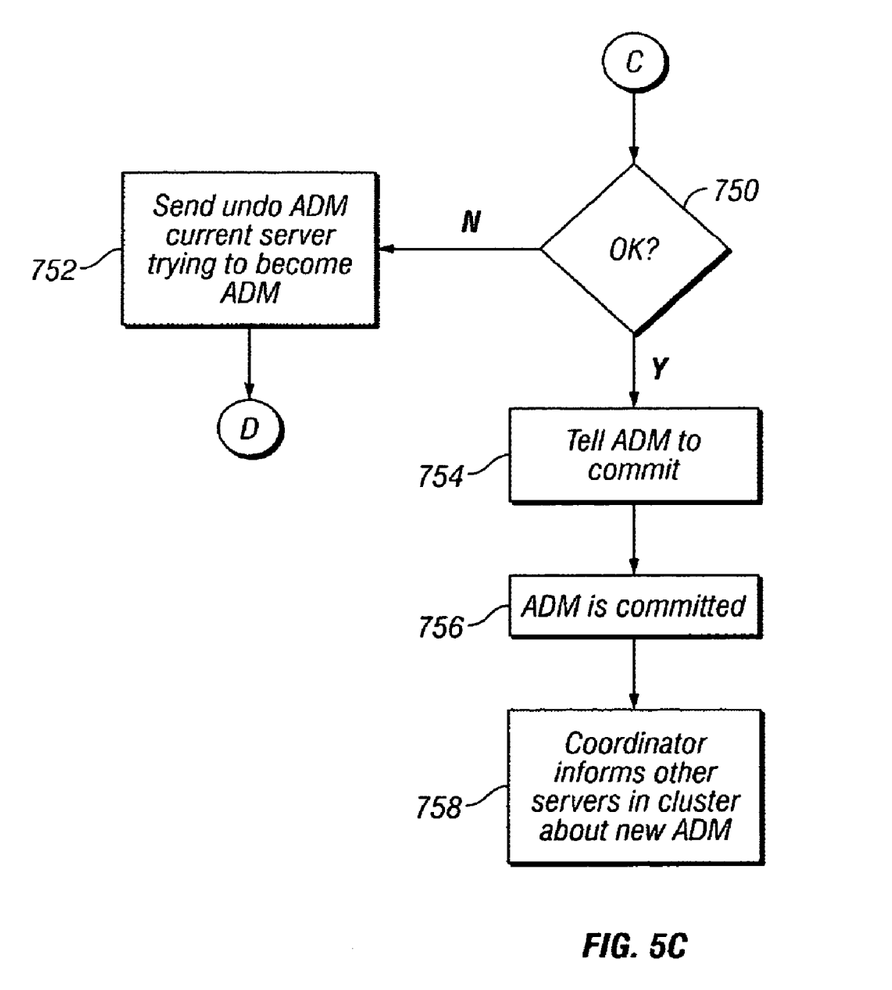

FIGS. 5A-5C are flow diagrams of a method according to the present invention for handling a server failure, software component, or SAN generation number mismatch In this example, it is determined that a server or communication with a server has failed (700). It is then determined whether there is still an administrator (702). For example, the server that failed may have been the administrator. If there is still an administrator then the failed server is physically isolated (708). An example of physically isolating the failed server is to disable the fiber channel switch port associated with the failed server.

The storage area network generation number is then updated and stored to the database (710). Thereafter, normal operation continues (712).

If there is no longer an administrator (702), then a server is selected to try and become the new administrator (704). There are several ways to select a server to try to become the new administrator. One example is a random selection of one of the servers. The elected server is then told to try to become the new administrator (706). One example of how the server is selected and told to become the new administrator is through the use of a group coordinator.

In one embodiment, the group coordinator is elected during the formation of a process communication group using an algorithm that can uniquely identify the coordinator of the group with no communication with any server or node except that required to agree on the membership of the group. For example, the server with the lowest numbered Internet Protocol (IP) address of the members can be selected. The coorindator can then make global decisions for the group of servers, such as the selection of a possible administrator. The server selected as administrator is preferably one which has a high probability of success of actually becoming the administrator. The group coordinator attempts to place the administrator on a node which might be able to connect the SAN hardware and has not recently failed in an attempt to become the SAN administrator.

The selected server then attempts to acquire the storage area network locks (720). If it cannot acquire the SAN locks, then it has failed to become the administrator (724). If it succeeds in acquiring the SAN locks (720), then it attempts to read the SAN generation number from the membership database (722). The database can be maintained in one of the membership partitions on a shared storage and can be co-resident with the SAN locks. A server may fail to acquire the SAN locks for several reasons including but not limited to physical storage isolation, ownership of the SAN locks by an existing administrator in the cluster or ownership by another cluster on the same storage fabric.

If the server fails to read the SAN generation number from the database (722), then it drops the SAN locks (726), and it has failed to become the administrator (724). Once the server has failed to become the administrator (724), the group coordinator selects a different server to try to become the new administrator (704 FIG. 5A).

If the server can read the SAN generation number from the database, then it increments the SAN generation number and stores it back into the database (728). It also informs the group coordinator that this server is now the administrator (730). The group coordinator receives the administrator update (732). It is then determined if it is permissible for this server to be the new administrator (750). If it is not okay, then a message to undo the administrator status is sent to the current server trying to become the administrator (752). Thereafter, the group coordinator selects a server to try to become the new administrator (704 of FIG. 5A).

If it is okay for this server to be the new administrator, the administrator is told to commit (754), and the administrator is committed (756). The coordinator then informs the other servers in the cluster about the new administrator (758).

Figure 6:
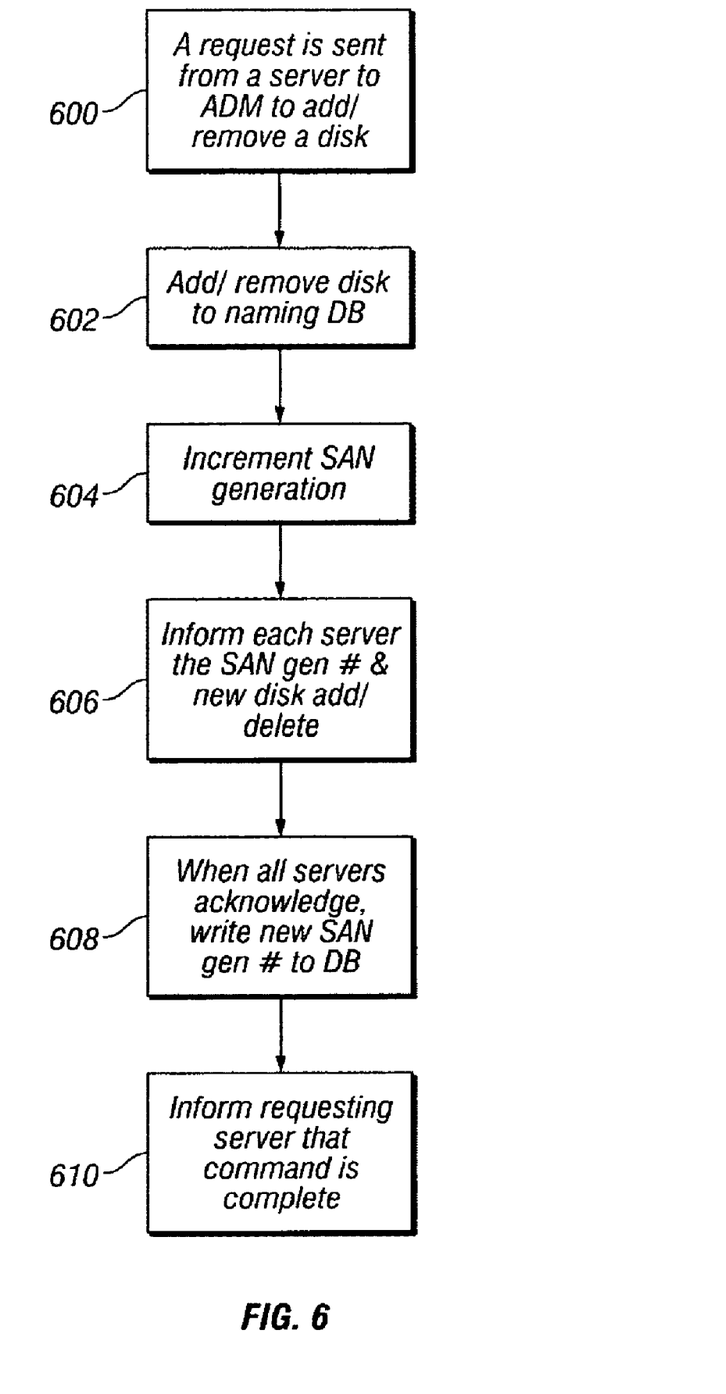
FIG. 6 is flow diagram of a method according to an embodiment of the present invention for adding or removing shared storage.

FIG. 6 is flow diagram of a method according to an embodiment of the present invention for adding or removing shared storage. In this example, a request is sent from a server to the administrator to add or remove a shared storage (600), such as a disk. The disk is then added or removed to the naming database (602). The naming database is preferably maintained on the shared storage accessible by all servers and the location is known by all servers before they join the cluster. Servers with no knowledge of the location of a naming database are preferably not eligible to become a SAN administrator but may join a cluster with a valid administrator.

The SAN generation number is then incremented (604). Each server in the cluster is then informed of the SAN generation number and the addition or deletion of the new disk (606). When all the servers in the cluster acknowledge, the new SAN generation number is written to the database (608). The requesting server is then notified that the addition/removal of the disk is complete (610).

Figure 7:
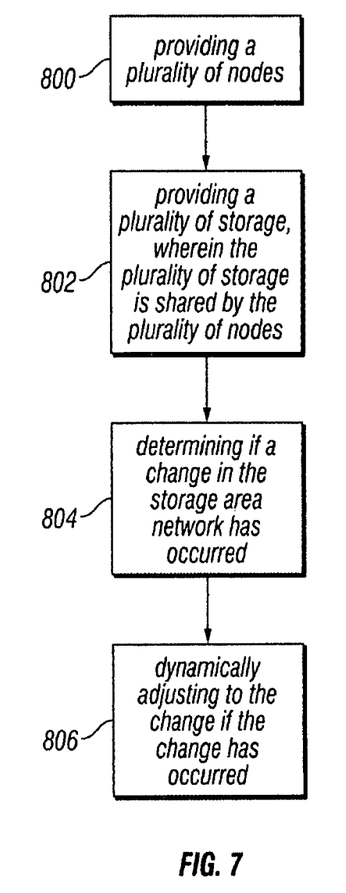
FIG. 7 is a flow diagram of a method according to an embodiment of the present invention for managing a storage area network.

FIG. 7 is a flow diagram of a method according to an embodiment of the present invention for managing a storage area network. In this example, a plurality of nodes is provided (800). A plurality of storage is also provided, wherein the plurality of storage is shared by the plurality of nodes (802). It is determined whether a change in the storage area network has occurred (804). Examples of a change include structural changes such as adding a server, deleting a server, adding a storage, deleting a storage, connecting or disconnecting an interface. If a change has occurred, then the system dynamically adjusts to the change (806).

Figure 8:
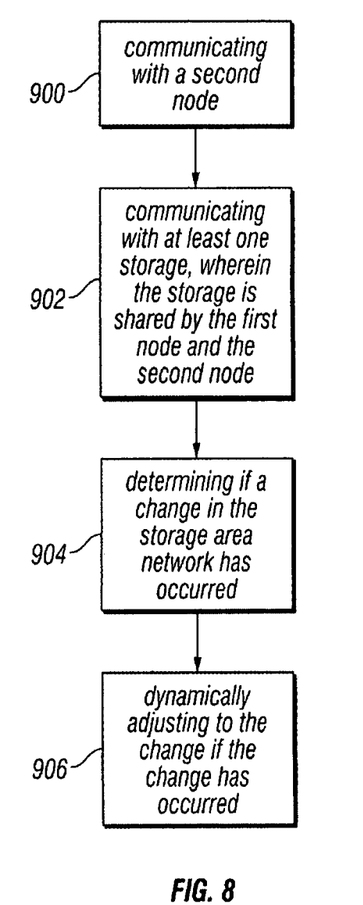
FIG. 8 is a flow diagram of a method managing a storage area network in a first node according to an embodiment of the present invention.

FIG. 8 is a flow diagram of a method managing a storage area network in a first node according to an embodiment of the present invention. In this example, the first node communicates with a second node (900), and communicates with at least one storage (902), wherein the storage is shared by the first node and the second node. It is determined if a change in the storage area network has occurred (904). If a change has occurred, then the first node adjusts dynamically to the change (906).

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention.

Accordingly, the present embodiments are to be considered as illustrative and not restrictive, and the invention is not to be limited to the details given herein, but may be modified within the scope and equivalents of the appended claims.

What is claimed is:

1. A method of managing a storage area network (SAN) comprising:
   providing a plurality of nodes;
   providing a plurality of storage, wherein the plurality of storage is shared by the plurality of nodes;
   designating an elected node to attempt to become an administrator of the plurality of nodes after detecting failure of a previous administrator of the plurality of nodes;
   allowing the elected node to become the administrator when the elected node is able to acquire locks for the SAN and able to read a generation number for the SAN;
   determining if a change in the storage area network has occurred;
   dynamically adjusting to the change if the change has occurred, wherein the plurality of nodes includes the elected node configured to manage the dynamic adjustment to the change in the storage area network;
   randomly selecting the elected node to attempt to become the administrator after the failure of the previous administrator; and
   sending the elected node a message to undo becoming the administrator when a group coordinator determines that the elected node cannot become the administrator.

2. The method of claim 1, wherein the change is adding a node to the plurality of nodes.

3. The method of claim 1 further comprising, determining by a group coordinator whether the elected node is permitted to become the administrator, the group coordinator making global decisions for the plurality of nodes.

4. The method of claim 1 further comprising, incrementing the generation number for the SAN after the elected node becomes the administrator.

5. The method of claim 1 further comprising, failing to allow the elected node to become the administrator when the locks are owned by another cluster of servers in the SAN.

6. The method of claim 1 further comprising, failing to allow the elected node to become the administrator when the locks are owned by another administrator in the SAN.

7. The method of claim 1 further comprising, failing to allow the elected node to become the administrator when the elected node is not able to read the locks in the SAN.

8. The method of claim 1 further comprising, instructing the elected node to commit to be the administrator after a group coordinator authorizes the elected node to be the administrator.

9. The method of claim 1, further comprising incrementing the generation number by the elected nod.

10. The method of claim 1, wherein the change is adding a storage to the plurality of storage.

11. The method of claim 10, further comprising adding the storage to a database.

12. The method of claim 10, further comprising incrementing a generation number.

13. The method of claim 1, wherein the change is deleting a storage to the plurality of storage.

14. The method of claim 1, wherein a node of the plurality of nodes is dynamically selected as an administrator.

15. A system of managing a storage area network (SAN) comprising:
   a processor configured to communicate with a second node and at least one storage, wherein the storage is shared by the processor and the second node;
   the processor also being configured to determine if a change in the storage area network has occurred; and
   dynamically adjusting to the change if the change has occurred, wherein the processor is associated with an elected node configured to manage the dynamic adjustment to the change in the storage area network,
   wherein the elected node is randomly designated as an administrator to replace an administrator that failed, the elected node being designated as the administrator after the elected node acquires locks for the SAN, reads a generation number for the SAN, and receives approval to become the administrator from a group coordinator, and
   the elected node is sent a message to undo becoming the administrator when a group coordinator determines that the elected node cannot become the administrator; and
   a memory coupled with the processor, the memory configured to provide instructions to the processor.

16. A computer readable storage medium having instructions for causing a processor to execute a method comprising:
   communicating with a second node;
   communicating with at least one storage, wherein the storage is shared by a first node and the second node;
   electing a group coordinator;
   using the group coordinator to elect the first node to replace an administrator that failed after the first node successfully acquires locks for the SAN and reads a generation number for the SAN;
   denying the first node to be the administrator when the first node is unable to either acquire the locks or read the generation number;
   determining if a change in the storage area network has occurred;
   dynamically adjusting to the change if the change has occurred, wherein the first node is an elected node configured to manage the dynamic adjustment to the change in the storage area network;
   randomly selecting the elected node to attempt to become the administrator after the failure of a previous administrator; and
   sending the elected node a message to undo becoming the administrator when the group coordinator determines that the elected node cannot become the administrator.

* * * * *